(12) United States Patent
Floering

(10) Patent No.: US 11,438,358 B2
(45) Date of Patent: Sep. 6, 2022

(54) AGGREGATING ASSET VULNERABILITIES

(71) Applicant: Veracode, Inc., Burlington, MA (US)

(72) Inventor: Michael Floering, Jamaica Plain, MA (US)

(73) Assignee: Veracode, Inc., Burlington, MA (US)

( * ) Notice: Subject to any disclaimer, the term of this patent is extended or adjusted under 35 U.S.C. 154(b) by 471 days.

(21) Appl. No.: 16/011,606

(22) Filed: Jun. 18, 2018

(65) Prior Publication Data

US 2018/0302427 A1  Oct. 18, 2018

Related U.S. Application Data

(63) Continuation of application No. 14/747,291, filed on Jun. 23, 2015, now abandoned.

(51) Int. Cl.
| | | |
|---|---|---|
| *H04L 29/06* | (2006.01) | |
| *H04L 9/40* | (2022.01) | |
| *H04L 61/4511* | (2022.01) | |
| *H04L 67/02* | (2022.01) | |

(52) U.S. Cl.
CPC ...... *H04L 63/1433* (2013.01); *H04L 61/1511* (2013.01); *H04L 67/02* (2013.01)

(58) Field of Classification Search
CPC ... H04L 63/1433; H04L 67/02; H04L 61/1511
See application file for complete search history.

(56) References Cited

U.S. PATENT DOCUMENTS

| | | | |
|---|---|---|---|
| 8,826,444 B1 * | 9/2014 | Kalle | H04N 21/25816 709/223 |
| 2004/0006704 A1 | 1/2004 | Dahlstrom et al. | |
| 2005/0138426 A1 | 6/2005 | Styslinger | |
| 2007/0097963 A1 | 5/2007 | Thermos | |
| 2008/0172382 A1 * | 7/2008 | Prettejohn | H04L 63/126 |
| 2014/0137190 A1 | 5/2014 | Carey et al. | |
| 2014/0173739 A1 | 6/2014 | Ahuja et al. | |
| 2014/0245376 A1 | 8/2014 | Hibbert et al. | |
| 2014/0344936 A1 | 11/2014 | Thario | |

(Continued)

OTHER PUBLICATIONS

International Search Report and Written Opinion for International Application No. PCT/US2016/038103 dated Sep. 20, 2016. (10 pages).

*Primary Examiner* — Tri M Tran
(74) *Attorney, Agent, or Firm* — Gilliam IP PLLC

(57) ABSTRACT

In a system for determining vulnerabilities associated with a web property, requests are communicated to network accessible servers associated with a set of one or more domains. Software components indicated in responses from the network accessible servers are identified. Vulnerability information is obtained for the software components. An aggregate vulnerability is determined for each network accessible server based on at least one of a ratio of software components of the network accessible server indicated as vulnerable by the vulnerability information to total software components used by the network accessible server and a frequency of use of those of the plurality of software components of the network accessible server indicated as vulnerable by the vulnerability information. Vulnerability of the network accessible servers is indicated based on the aggregate vulnerabilities.

20 Claims, 3 Drawing Sheets

```
[{ 'name' : 'Component A' , 'version' : '1.1' },
 { 'name' : 'Component A' , 'version' : '1.6' },
 { 'name' : 'Component A' , 'version' : '1.4' },
 { 'name' : 'Component A' , 'version' : null },
 { 'name' : 'Component B' , 'version' : '1.4' }]
```

(56) References Cited

U.S. PATENT DOCUMENTS

2015/0237062 A1* 8/2015 Roytman ............ H04L 63/1433
726/25
2017/0078322 A1* 3/2017 Seiver ................. H04L 43/0876

* cited by examiner

```
[{ 'name': 'Component A', 'version': '1.1' },
 { 'name': 'Component A', 'version': '1.6' },
 { 'name': 'Component A', 'version': '1.4' },
 { 'name': 'Component A', 'version': null },
 { 'name': 'Component B', 'version': '1.4' }]
```

AGGREGATING ASSET VULNERABILITIES

FIELD OF THE INVENTION

This disclosure generally relates to vulnerability assessment of computer systems and, more particularly, to systems and methods for identifying and aggregating vulnerabilities associated with a network accessible server such as a web server.

BACKGROUND OF THE INVENTION

A web property often includes a network accessible server such as a web server for providing a web service, a secure shell server (SSH), etc. In general, a network accessible server is a system that receives requests from client computers such as laptops, tablets, smart phones, etc., of Internet users and also from other servers in a network, and responds to such requests by providing content and/or one or more functionalities to the clients. For example, a web server may: stream audio/video files, perform a web search, run a database query in response to a client request to provide the requested information, monitor and control a physical system, translate the rendered content from one language into another, etc. A web server may be distributed across several physical computers/servers and a single physical server can be configured as two or more web servers. An SSH server may permit a client computer to access protected computing resources.

In order to provide a service, a network accessible server typically runs one or more software applications. In some instances, one software application may invoke another software application, e.g., to delegate to the other software application a part of the operations corresponding to the requested service. Some of these different software applications associated with a network accessible server may include vulnerabilities such as allowing unauthorized access to client data, commonly called data breach, permitting the network accessible server to be hijacked by a malicious user in furtherance of attacks against other web properties, etc. In some instances, a software application used by a network accessible server may include malware, viruses, etc., and the execution of such a software application in the course of rendering a requested service to a client, therefore, can cause harm to the client.

A web property such as a network accessible server can be owned directly or indirectly by an entity. Usually, the owner entity is liable for any problems associated with a web property, such as those that can be caused by one or more software applications used by a network accessible server. Direct ownership generally occurs when the entity develops or contracts a third party to develop a web property. For example, the owner entity may develop or contractually acquire various software applications to be used in rendering one or more web services. As such, under direct ownership, the owner entity can typically enforce procedures to minimize any problems occurring with a web property/server for which the owner entity may be liable. Problems of which the owner entity is not aware may nevertheless exist in association with some directly owned web properties in part because a typical web service often uses a number of software applications/components that are interrelated in a complex manner, and several of these components may be obtained from different third parties. As such, in some instances, the owner is unaware of all of the software applications/components that are used by a particular web property/server, and some of these software applications/components may have vulnerabilities.

Indirect ownership can occur when an entity may not actively develop and/or manage a web property/server and may not actively control such development/management, but may acquire rights to the web property/server through business/legal transactions such as mergers, acquisitions, etc. As such, an indirect owner often does not know the software applications/components contents, attributes, implementation details, security details, or other characteristics of the indirectly owned web property/server, so as to implement procedures that can minimize the occurrence of problems with that web property/server. In some instances, an indirect owner may not even know the existence of some of the owned web properties/servers. Nevertheless, an indirect owner entity may be responsible or liable for any problems associated with any indirectly owned web property/server, including the consequences of any failures of the web property/server, the consequences of attacks against the web property/server, and any harmful operations performed by the web property/server.

Certain vulnerabilities in both directly owned and acquired software applications/components can be identified by analyzing source and/or machine-readable code of the software. Such testing, however, can be time consuming and onerous, and may need to be repeated when any of the software applications/components is changed substantially. Moreover, a web property owner may not be willing to or may even be unable to grant access to the software code to a third party tester.

SUMMARY OF THE INVENTION

Various embodiments described herein feature identifying any vulnerabilities associated with a network accessible server without analyzing source and/or machine-readable code of any of the software applications/components used by the network accessible server. This is achieved, at least in part, by recording one or more responses to one or more requests to a network accessible server, and by analyzing the received responses to identify the software components (which may include software applications, subsystems, components, etc.) used by the network accessible server. Particular versions of various software components may also be identified. Information on vulnerabilities associated with each software component and particular versions thereof, if identified, is then obtained from a database. That vulnerability information is aggregated to determine the vulnerability of a network accessible server.

Accordingly, in one aspect, a method is provided for determining whether a set of assets (e.g., web properties) of an entity has one or more weaknesses. The method includes performing by a processor the steps of: (a) receiving from a first asset in the set of assets a first set of responses to one or more queries. The first set of responses may include a first set of attributes of one or more software components associated with the first asset. The one or more queries may be sent to the first asset via a network. The method also includes (b) analyzing the first set of attributes to identify the one or more software components associated with the set of assets, and (c) obtaining, from a repository, information on at least one of the one or more identified software components. The method further includes (d) determining using the information whether the first asset and, hence, the set of assets, has a weakness.

The first asset may include a web application server (also called a web server) and/or a secure shell (SSH) server. In some embodiments, the repository includes a software component properties database and/or a software component index. Obtaining information from a repository may include transmitting one or more attributes of one or more identified software components to the repository, e.g., through a network. A response in the set of responses may include a hypertext transfer protocol (HTTP) response and/or a banner. The response may include a header and a body. In some embodiments each one of the set of responses is related to a respective user agent. An attribute from the first set of attributes of software components may include one or more of: a software component name attribute, a software component version attribute, and a unique identifier (ID) corresponding to a software component.

In some embodiments, the set of responses includes a first response that includes a software component name attribute and a version attribute, and a second response that also includes a software component name attribute and a version attribute. Analyzing the first set of attributes may include designating as a first software component a software component corresponding to the name attribute in the first response. The name attribute in the second response may be compared with the name attribute in the first response. In some embodiments, if the name attribute in the second response does not match the name attribute in the first response, the method further include designating as a second software component a software component corresponding to the name attribute in the second response. If the name attribute in the second response matches the name attribute in the first response, the method may include associating the version attributes in the first and second responses with the first software component. The method may include identifying an older one of the versions indicated by the version attributes in the first and second responses.

In some embodiments, obtaining information on any one of the several software components includes receiving a first report on the first software component using the version attribute in the first response and, optionally, receiving a second report on the first software component using the version attribute in the second response. Determining whether the set of assets has one or more weaknesses may include evaluating if one or more of the first and the optional second reports indicates a vulnerability associated with the first software component. In some embodiments, the method includes identifying an additional software component from the information received from the repository, where the additional software component is implied by at least one of the several software components identified in step (b). The method may also include obtaining, from the repository, additional information on the identified additional software component, and determining using the additional information whether the set of assets has a weakness, e.g., as described above.

In some embodiments, the set of assets includes a second asset, and the method includes comprising, prior to performing step (b), (e) receiving from the second asset a second set of responses to one or more queries. The second set of responses may include a second set of attributes of one or more software components associated with the second asset. The method may also include: (f) adding to the first set of attributes the second set of attributes. In this way, when the vulnerabilities are determined by analyzing the attributes in the first set of assets, vulnerabilities corresponding to software components used by both the first and second assets may be identified. In some embodiments, the method includes receiving, in memory, a list of resources and scanning, using a resource scanner, each resource in the list, to obtain the set of assets associated with an entity. Prior to performing step (b), steps (e) and (f) may be repeated for each asset in the set of assets, to determine if the set of various assets associated with the entity has a weakness. A resource in the list of resources may include a domain name, an Internet protocol (IP) address, or a CIDR block. Resource scanning may include one or more of port scanning, idle scanning, domain name service (DNS) lookup, and subdomain brute-forcing.

In another aspect, a computer system includes a first processor and a first memory coupled to the first processor. The first memory includes instructions which, when executed by a processing unit that includes the first processor and/or a second processor, program the processing unit, that is in electronic communication with a memory module that includes the first memory and/or a second memory, to: (a) receive from a first asset in the set of assets a first set of responses to one or more queries. The first set of responses may include a first set of attributes of one or more software components associated with the first asset. The instructions also program the processing unit to: (b) analyze the first set of attributes to identify the one or more software components associated with the set of assets. Moreover, the instructions program the processing unit to: (c) obtain, from a repository, information on at least one of the one or more identified software components, and (d) determine using the information whether the set of assets has a weakness.

In some embodiments, the instructions program the processing unit to transmit the queries to the first asset, and to determine from the received first set of responses if the first asset includes a web application server or a secure shell (SSH) server. The instructions may also program the processing unit to transmit one or more of the queries according to a user agent, where one or more responses in the set of responses are related to the user agent. In some embodiments, the set of assets includes a second asset, and the instructions program the processing unit to: (e) receive from the second asset a second set of responses to one or more queries. The second set of responses may include a second set of attributes of one or more software components associated with the second asset. The instructions may also program the processing unit to: (f) add to the first set of attributes the second set of attributes, prior to analyzing by the processing unit the first set of attributes to identify the one or more software components associated with the set of assets.

In some embodiments, the instructions program the processing unit to receive in memory a list of resources, and scan, using a resource scanner, each resource in the list, to obtain the set of assets associated with an entity, to determine if the set of assets associated with the entity has a weakness. The instructions may program the processing unit to perform as the resource scanner. In various embodiments, the instructions can program the processing unit to perform one or more of the method steps described above.

In another aspect, an article of manufacture that includes a non-transitory storage medium has stored therein instructions which, when executed by a processor program the processor, which is in electronic communication with a memory, to: (a) receive from a first asset in the set of assets a first set of responses to one or more queries. The first set of responses may include a first set of attributes of one or more software components associated with the first asset. The instructions also program the processor to: (b) analyze the first set of attributes to identify the one or more software components associated with the set of assets. Moreover, the instructions program the processor to: (c) obtain, from a repository, information on at least one of the one or more identified software components, and (d) determine using the information whether the set of assets has a weakness. In various embodiments, the stored instructions can program the processor to perform one or more of the method steps described above.

BRIEF DESCRIPTION OF THE DRAWINGS

Various embodiments of the present invention taught herein are illustrated by way of example, and not by way of limitation, in the figures of the accompanying drawings, in which:

FIG. 2 shows an example of intermediate results obtained using an embodiment of a vulnerability analysis system.

DETAILED DESCRIPTION

Figure 1:
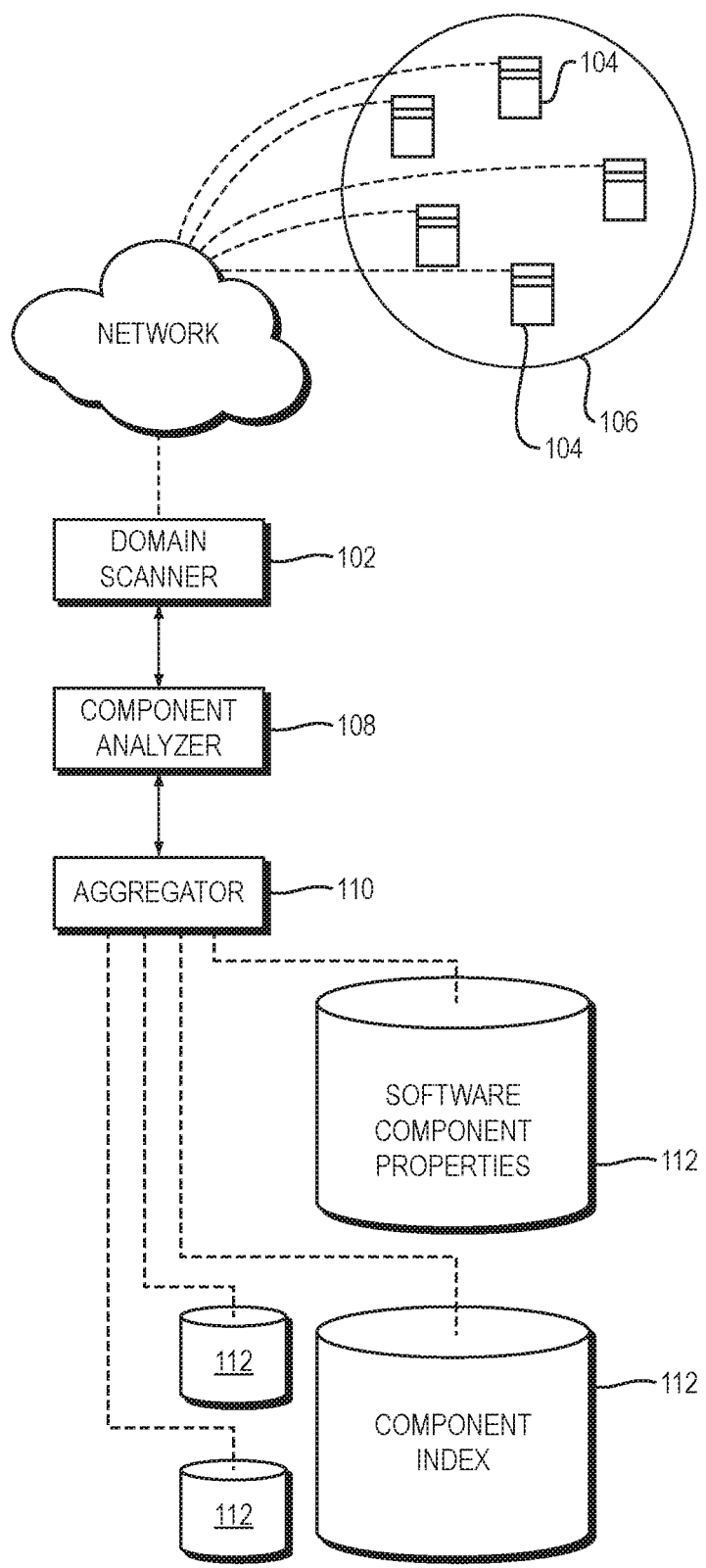
FIG. 1 schematically depicts a vulnerability analysis system, according to one embodiment.

With reference to FIG. 1, a domain scanner 102 identifies one or more network accessible servers (e.g., web server 104), that are associated with a specified domain/subdomain 106 such as XYZ.com, www.XYZ.com, w3.PQR.org, etc. To this end, the domain scanner 102 may send a request such as a hyper-text transfer protocol (HTTP) request, Web Request, etc., to various Internet Protocol (IP) addresses associated with the domain/subdomain 106. The domain scanner 102 may designate any server responding to such a request a network accessible server. The responses may be recorded and/or forwarded to a component analyzer 108. In one embodiment, the domain scanner 102 selects a particular network accessible server (e.g., the web server 104) and sends additional requests to the web server 104. Each request may correspond to a different user agent such as a Firefox® user agent, an Internet Explorer® user agent, a Chrome user agent, a mobile device user agent, etc. The corresponding responses from the web server 104 and an identifier of the web server are forwarded to the component analyzer 108. In some embodiments, the domain scanner 102 selects each server designated as a network accessible server, sends additional requests thereto, and forwards the received responses and an identifier for that network accessible server to the component analyzer 108. A response may include a header and a body, and a header can be an HTTP header, a banner, etc. In some embodiments, only the header portion of a response is forwarded to the component analyzer 108. In some embodiments, another module instead of or in addition to the domain scanner 102 sends requests to one or more network accessible servers (e.g., the web server 104).

The description below refers to web servers for the sake of convenience, but it should be understood that the systems and methods described herein are not limited to web servers only and can analyze various types of network accessible servers. The component analyzer 108 analyzes the responses received from a particular web server (e.g., the web server 104) and identifies software components therein. The types or categories of components/software subsystems/technologies identified by the component analyzer 108 include but are not limited to content management systems, e-Commerce platforms, JavaScript frameworks, etc. The component analyzer 108 may also have knowledge about typical relationships between software components. For example, if the component analyzer 108 determines that the web server 104 uses Component A (e.g., Wordpress), the component analyzer 108 may determine, using a knowledgebase thereof, that the web server 104 uses Component B (e.g., PHP), as well.

In identifying a software component, the component analyzer 108 typically determines one or more attributes of the component. Common attributes include the component name and the component version. In some embodiments, the component attributes that are determined include a unique identifier associated with the software component. With reference to FIG. 2, the component analyzer 108 analyzed five different responses from the web server 104 in which, from the first response, the component analyzer determined that the web server 104 uses "Component A" version "1.1." From the next two responses, the component analyzer 108 determined again, by comparing the name attributes, that the web server 104 uses "Component A," but determined that versions "1.6" and "1.4" thereof are used. Some web servers may in fact use different versions of the same component in different contexts, e.g., with different user agents. In some instances, different versions of the same component (e.g., jQuery) may be loaded with a single user agent. Therefore, different responses can identify different versions of the same component. From the fourth response, the component analyzer 108 determined again that the web server 104 uses "Component A," but did not identify the particular version used from the fourth response. In some instances, the component analyzer 108 may identify a version of a software component used, but may not be able to determine the name thereof. From the fifth response, the component analyzer 108 determined by comparing the name attributes that the web server 104 uses another component, "Component B" version "1.4."

It should be understood that the analysis of responses described with reference to FIG. 2 is illustrative only and that in general, a component analyzer may analyze any number of responses. For example, the component analyzer 108 may analyze 1, 2, 6, 10, 25, 100, 140, 200, etc., messages from each of several e.g., 2, 3, 5, 10, etc., web servers. In general, the number of software components used by a web server that a component analyzer may identify can be any number such as 1, 3, 7, 8, 10, 15, 20, etc. The identified software components may include software components implied by other identified software components. In various embodiments, the version numbers can include names and numbers, and a version number, in general, can be any character or string of any length of any letters, numbers, and/or characters. While FIG. 2 depicts that the component analyzer 108 stores the information about software components as a JSON object, different embodiments of a component analyzer may use other structures such as linked lists, arrays, trees, heaps, hash tables, etc., to store and to analyze further the extracted information.

Referring back to FIG. 1, after identifying at least some of the software components used by a web server, an aggregator 110 processes the list of identified components. For example, the aggregator 110 may remove duplicates. In some embodiments, a component is considered to be a duplicate of another component if the two components have the same name and other attributes, e.g., the same version number. From a de-duplicated list, the aggregator 110 may optionally sort the identified versions of each component, and may optionally identify the latest and/or the oldest version. To this end, the component analyzer may employ alpha-numeric sorting. In some embodiments, the aggregator 110 queries a database that provides the release date associated with a specified version of a specified component. This analysis can be useful because in some instances a vulnerability in an older version of a software component is cured in a later version. On the other hand, in some instances, a newer version has a vulnerability that did not exist in an older version or the older version was tested for vulnerabilities but the newer version was not and, hence, vulnerability information is available only for an older version. The aggregator 110 may also identify the most frequently and/or least frequently used versions of an identified software component.

For a selected version (e.g., the latest, oldest, most frequently occurring, etc.) of an identified software component, the aggregator 110 queries one or more databases 112 to obtain vulnerability information about that version of the software component. A database 112 may include a software component properties database and/or a software component index, and may be provided by a third party (e.g., Mitre.org, GitHub, etc.) or may be a proprietary database. The aggregator 110 may access the database 112 directly (e.g., through a proprietary network) and/or through a public network (e.g., the Internet). In some embodiments, the aggregator 110 obtains vulnerability information from the databases 112 for one or more selected versions (e.g., all versions) of one or more selected software components (e.g., all software components) determined to be associated with a selected web server determined to be belonging to a specified owner entity. This process may be repeated for one or more (e.g., all) other web servers determined to be belonging to that owner entity, and for other owner entities, as well. In addition to the vulnerability information, the databases 112 may provide the release dates of the specified versions of the specified software components.

For a selected web server (e.g., the web server 104), the aggregator 110 compiles the vulnerability information to determine vulnerability of the selected web server. In general, the vulnerability of a web server may depend on parameters such as the number of software components used by the web server where at least one version of the software component is reported as vulnerable by the database 112, the number of identified software components where each version or a significant number of versions are reported as vulnerable. In this context, significant can be 90% of all versions, 80% of all versions, 50% of all versions, etc. In some embodiments, the parameters may include respective degrees of vulnerabilities associated with various versions of various software components.

The parameters may also include a known or an expected frequency of use of a particular version and/or known or expected frequency at which the web server provides a service for which a particular component is used. A particular web server may provide two or more web services, where a different set of software components is used in rendering each service. As such, if a web server uses a version of a component reported to be vulnerable to facilitate a service that is provided infrequently, the web server may be designated as vulnerable, but to a lesser degree than if a version of a component reported to be vulnerable is used to facilitate a service that is provided relatively frequently.

The aggregator 110 can thus provide a measure of vulnerability of one or more web servers belonging to an owner entity. The vulnerability analysis may be performed periodically and/or when a significant change is made to a web server. The aggregator 110 performs the vulnerability analysis using responses to requests sent to a web server and, as such, the aggregator 110 can perform the vulnerability analysis remotely, without requiring access to any source code or machine-readable code of the web server.

Figure 3:
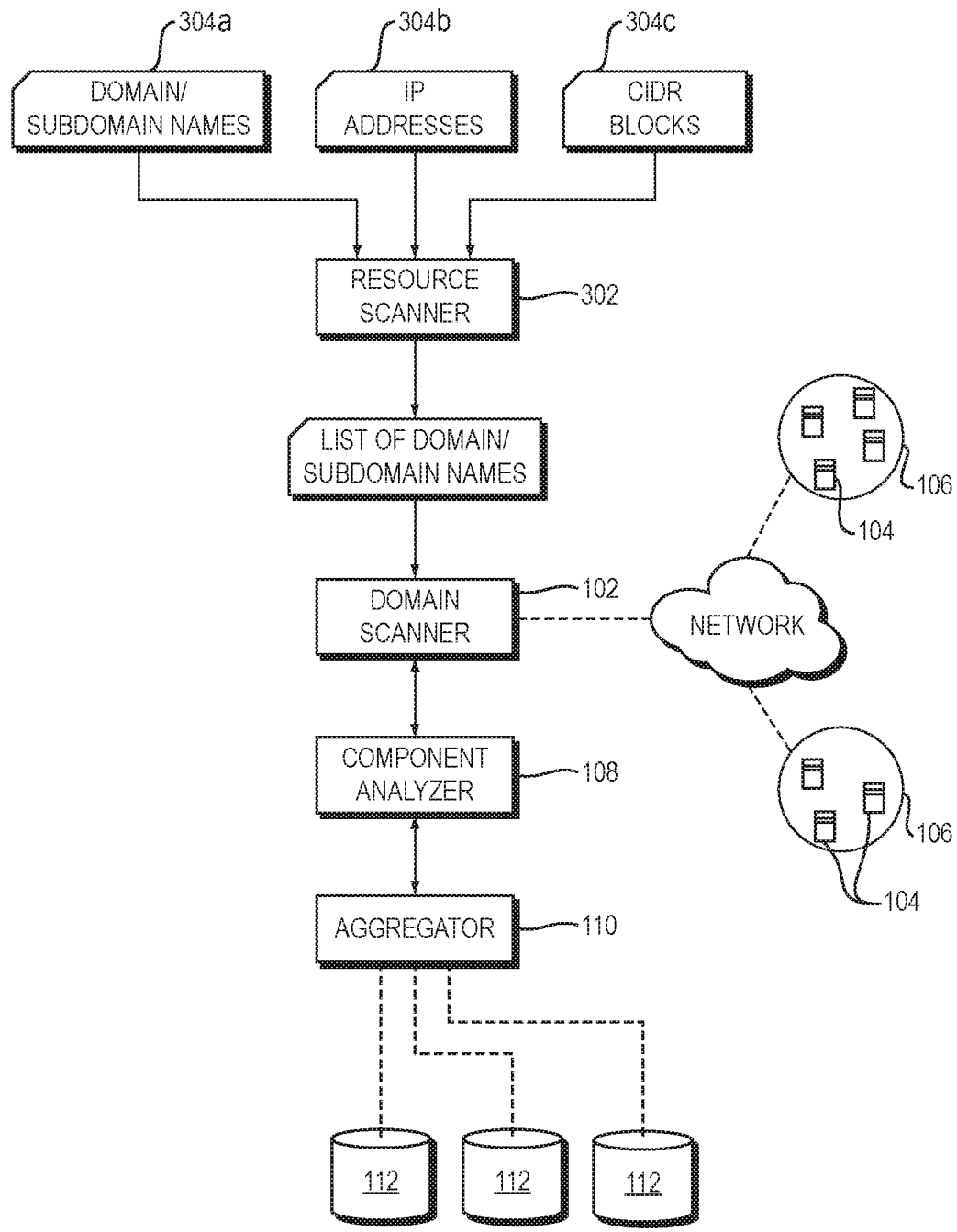
FIG. 3 schematically depicts a system for identifying domains and/or subdomains likely owned by an entity, according to one embodiment.

In some situations, an owner entity may not be aware of all of the web properties owned by the entity and for which the entity may be liable. In these situations, with reference to FIG. 3, a resource scanner 302 can receive information such as domain names and/or subdomain names 304a that are known to be owned by the entity, Internet protocol (IP) addresses 304b that are associated with the entity, and/or classless inter-domain routing (CIDR) blocks 304c. Using this information, the resource scanner 302 can generate a list 306 of domains and subdomain names owned by the entity. To this end, the scanner may employ one or more of port scanning, which can include transmission control protocol (TCP) scanning, protocol scanning, etc., idle scanning, domain name search (DNS) lookup, which may include one or more of standard DNS queries, zone transfer queries, and reverse DNS lookups, search using APIs provided by search engines, and subdomain brute-forcing on domain names, to identify the domains/subdomains that may be owned by the entity. One or more network accessible servers may be associated with each identified domain/subdomain. The domain scanner 102 (described with reference to FIG. 1) can identify these servers, for which the owner entity may be liable. The procedures described above with reference to FIGS. 1 and/or 2 may be applied to each identified network accessible server associated with each identified domain/subdomain to determine weaknesses associated with various web properties.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method comprising:
    communicating first requests to network accessible servers associated with a set of one or more domains;
    identifying a plurality of software components indicated in responses from the network accessible servers;
    obtaining vulnerability information for the plurality of software components;
    determining an aggregate vulnerability for each network accessible server based on at least one of a ratio of software components of the network accessible server indicated as vulnerable by the vulnerability information to total software components used by the network accessible server and a frequency of use of those of the plurality of software components of the network accessible server indicated as vulnerable by the vulnerability information; and
    indicating vulnerability of the network accessible servers based on the aggregate vulnerabilities.

2. The method of claim 1, further comprising identifying the network accessible servers associated with the set of domains.

3. The method of claim 2, wherein identifying the network accessible servers comprises communicating second requests to network addresses associated with the set of one or more domains to identify the network accessible servers.

4. The method of claim 1, wherein communicating the first requests comprises communicating to each of the network accessible servers multiple requests, each of which corresponds to a different user agent.

5. The method of claim 1, wherein the network accessible servers comprise web servers.

6. The method of claim 1, wherein identifying the plurality of software components comprises determining identifiers and versions of the plurality of software components.

7. The method of claim 6, wherein obtaining the vulnerability information for the plurality of software components comprises querying a set of one or more databases with the identifiers and versions of the plurality of software components.

8. The method of claim 1, wherein determining frequency of use of those of the software components of the network accessible server indicated as vulnerable comprises determining frequency of use across the network accessible servers.

9. The method of claim 1, wherein the first requests comprise hypertext transfer protocol requests.

10. The method of claim 1, wherein identifying the plurality of software components comprises determining names of the plurality of software components.

11. The method of claim 10, wherein obtaining the vulnerability information for the plurality of software components comprises querying a set of one or more databases with the names of the plurality of software components.

12. A non-transitory, computer-readable medium having instructions stored thereon that are executable by a computing device to perform operations comprising:
- communicating first requests to network accessible servers associated with a set of one or more domains;
- identifying a plurality of software components indicated in responses from the network accessible servers;
- obtaining vulnerability information for the plurality of software components;
- determining an aggregate vulnerability for each network accessible server based on at
  - least one of a ratio of software components of the network accessible server indicated as vulnerable by the vulnerability information to total software components of the network accessible server and frequency of use of those of the plurality of software components of the network accessible server indicated as vulnerable by the vulnerability information; and
- indicating vulnerability of the network accessible servers based on the aggregate vulnerabilities.

13. The non-transitory, computer-readable medium of claim 12, further having instructions executable by a computing device to perform operations comprising identifying the network accessible servers associated with the set of domains.

14. The non-transitory, computer-readable medium of claim 12, wherein communicating the first requests comprises communicating to each of the network accessible servers multiple requests, each of which corresponds to a different user agent.

15. The non-transitory, computer-readable medium of claim 12, wherein identifying the plurality of software components comprises determining identifiers and versions of the plurality of software components.

16. The non-transitory, computer-readable medium of claim 15, wherein obtaining the vulnerability information for the plurality of software components comprises querying a set of one or more databases with the identifiers and versions of the plurality of software components.

17. The non-transitory, computer-readable medium of claim 12, wherein obtaining the vulnerability information for the plurality of software components comprises querying a set of one or more databases with names of the plurality of software components.

18. An apparatus comprising:
- a hardware processor; and
- a physical storage medium having instructions stored therein, the instructions executable by the hardware processor to cause the apparatus to,
- communicate via a set of one or more network interfaces first requests to network accessible servers associated with a set of one or more domains;
- identify a plurality of software components indicated in responses from the network accessible servers;
- obtain vulnerability information for the plurality of software components;
- determine an aggregate vulnerability for each network accessible server based on at least
  - one of a ratio of software components of the network accessible server indicated as vulnerable by the vulnerability information to total software components of the network accessible server and frequency of use of those of the plurality of software components of the network accessible server indicated as vulnerable by the vulnerability information; and
- indicate vulnerability of the network accessible servers based on the aggregate vulnerabilities.

19. The apparatus of claim 18, wherein the instructions to identify the plurality of software components comprise instructions executable by the hardware processor to cause the apparatus to determine names of the plurality of software components.

20. The apparatus of claim 19, wherein the instructions to identify the plurality of software components comprise instructions executable by the hardware processor to cause the apparatus to query a set of one or more databases with the names of the plurality of software components.

* * * * *